(12) United States Patent
Kanamori (10) Patent No.: US 7,917,017 B2
(45) Date of Patent: Mar. 29, 2011

(54) MOTOR DRIVE APPARATUS AND METHOD

(75) Inventor: Atsushi Kanamori, Nukata-gun (JP)

(73) Assignee: DENSO CORPORATION, Kariya (JP)

( * ) Notice: Subject to any disclaimer, the term of this patent is extended or adjusted under 35 U.S.C. 154(b) by 759 days.

(21) Appl. No.: 11/902,669

(22) Filed: Sep. 25, 2007

(65) Prior Publication Data

US 2008/0112695 A1 May 15, 2008

(30) Foreign Application Priority Data

Nov. 14, 2006 (JP) ................................ 2006-307935
Jun. 7, 2007 (JP) ................................ 2007-151534

(51) Int. Cl.
*H02P 7/29* (2006.01)

(52) U.S. Cl. ........ 388/811; 318/268; 318/724; 318/809; 318/811; 388/809; 388/825

(58) Field of Classification Search ................... 318/254, 318/268, 724, 809, 811; 388/811, 825, 809
See application file for complete search history.

(56) References Cited

U.S. PATENT DOCUMENTS

| | | | | |
|---|---|---|---|---|
| 5,847,536 A | * | 12/1998 | Miyazaki et al. | ............. 318/811 |
| 6,008,619 A | * | 12/1999 | Murase et al. | ................ 318/811 |
| 6,362,582 B1 | * | 3/2002 | Bernauer et al. | ......... 318/400.01 |
| 6,556,461 B1 | * | 4/2003 | Khersonsky et al. | ........... 363/41 |
| 6,580,235 B2 | * | 6/2003 | Laurent | ....................... 318/400.1 |
| 7,276,878 B2 | * | 10/2007 | Phillips et al. | ................ 318/811 |
| 2003/0190161 A1 | | 10/2003 | Kessler | |
| 2006/0243068 A1 | | 11/2006 | Ueno et al. | |
| 2007/0052382 A1 | | 3/2007 | Nomura et al. | |

FOREIGN PATENT DOCUMENTS

| | | |
|---|---|---|
| JP | A-H06-30594 | 2/1994 |
| JP | A-2006-157987 | 6/2006 |

OTHER PUBLICATIONS

Machine traslation of JP 06-030594 A.*
Office Action dated Sep. 11, 2009 in corresponding Chinese patent application No. 2007 1018 63041 (and English translation).
Decision of Rejection mailed on Oct. 11, 2010 issued from the Chinese Patent Office in the corresponding Chinese patent application No. 200710186304.1 (with English translation).

* cited by examiner

*Primary Examiner* — Walter Benson
*Assistant Examiner* — Kawing Chan
(74) *Attorney, Agent, or Firm* — Posz Law Group, PLC (57) ABSTRACT

If a PWM duty instruction D1 determined by a duty calculation circuit exceeds an upper limit value, a duty signal processing circuit in a motor drive apparatus divides a switching current supply period in each of the phases into a first current supply period and a second current supply period. In the first current supply period, the duty is set to the upper limit value. In the second current supply period, the duty is set to 100%, and the length of the second current supply period is set depending upon the duty instruction.

20 Claims, 11 Drawing Sheets

MOTOR DRIVE APPARATUS AND METHOD

CROSS REFERENCE TO RELATED APPLICATION

This application is based on and incorporates herein by reference Japanese Patent Applications No. 2006-307935 filed on Nov. 14, 2006 and No. 2007-151534 filed on Jun. 7, 2007.

FIELD OF THE INVENTION

This invention relates to a motor drive apparatus and method for driving a motor based on a PWM control.

BACKGROUND OF THE INVENTION

Figure 12:
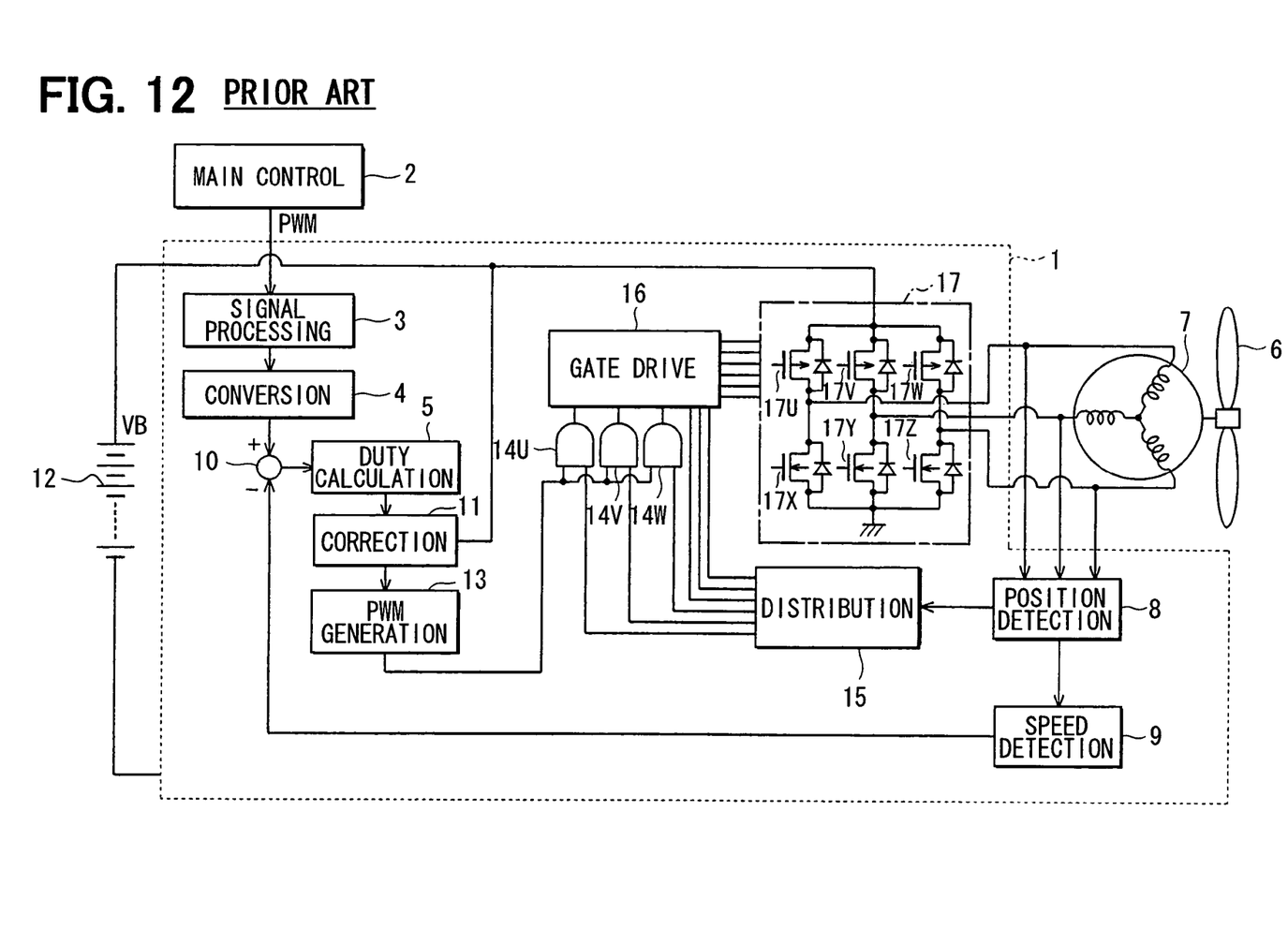
FIG. 12 is a circuit diagram illustrating a motor drive apparatus according to prior art.

Various motor drive apparatuses are used in many fields. One example is, as illustrated in FIG. 12, a fan motor drive apparatus 1 for driving a fan motor 7, which is a three-phase motor and mounted on a vehicle, by feeding an electric current of a rectangular waveform to each phase based on the pulse width modulation (PWM) control. The fan motor drive apparatus 1 receives, through a signal processing circuit 3, a rotation speed instruction for a fan 6 applied as a PWM signal from a main controller 2 such as an electronic control unit (ECU), generates a voltage signal corresponding to the duty of the PWM signal through conversion, and sends it to a rotation speed instruction conversion circuit 4. The main controller 2 receives an output signal from a water temperature sensor (not shown) that detects the temperature of the water in, for example, a radiator and outputs a rotation speed instruction that is dependent upon the water temperature that is detected.

The rotation speed instruction conversion circuit 4 determines the rotation speed instruction depending upon the voltage signal and sends it to a duty calculation circuit 5. The fan 6 is rotated by a three-phase brushless DC motor 7, and the rotational state of the motor 7 is detected by a position detection circuit 8. The position detection circuit 8 may detect the rotation based on a voltage waveform induced in the winding of the motor 7 (sensorless system), or may use a Hall IC, a resolver or a sensor such as rotary encoder. Therefore, the input terminals of the position detection circuit 8 do not necessarily have to be directly coupled to the winding of the motor 7.

A rotation speed detection circuit 9 calculates the rotation speed of the motor 7 based on a detection signal (rotational position signal of a rotor of the motor 7) output from the position detection circuit 8, and outputs it to the input side of the duty calculation circuit 5. A subtractor 10 calculates a difference between the rotation speed calculated by the rotation speed detection circuit 9 and the rotation speed instruction output from the rotation speed instruction conversion circuit 4, and the result of subtraction is input to the duty calculation circuit 5. The duty instruction calculated by the duty calculation circuit 5 is corrected by a voltage correction circuit 11. The voltage correction circuit 11 detects the voltage of a battery 12 of the vehicle, and adds the above correction to the duty instruction depending upon a variation in the battery voltage.

The corrected duty instruction is output to a PWM signal generation circuit 13. The PWM signal generation circuit 13 generates a PWM signal based on a carrier wave of PWM control generated therein and on the PWM duty determined by the duty calculation circuit 5, and outputs it in common to the input terminals on one side of three AND gates 14U, 14V and 14W.

The detection signals output from the position detection circuit 8 are further applied to a three-phase current distribution circuit 15 which generates 120-degree (120°) current pattern signals based on rectangular waves depending upon the rotational positions of the rotor represented by the detection signals. The 120-degree current pattern signals are output to the input terminals on the other side of AND gates 14U, 14V and 14W, and to a gate drive circuit 16.

While the current pattern signals generated by the three-phase current distribution circuit 15 are assuming the high level, the AND gates 14U, 14V and 14W send the PWM signals generated by the PWM signal generation circuit 13 to the gate drive circuit 16 as high-side signals (high potential side). Further, the current pattern signals directly applied to the gate drive circuit 16 from the three-phase current distribution circuit 15 serve as low-side (low potential side) signals.

An inverter circuit 17 includes, for example, six power MOSFETs (switching elements) 17U, 17V, 17W, 17X, 17Y and 17Z in a three-phase bridge. Gate signals output from the gate drive circuit 16 are applied to the gates of the six FETs 17U to 17Z.

To drive the motor 7 by PWM-controlling the rectangular wave current by using the drive apparatus 1, the ON duty for switching the high-side FETs 17U, 17V and 17W of the inverter circuit 17 is varied to control the rotation speed of the motor 7. In this case, the rotation speed of the motor 7 varies nearly in proportion to the ON duty of the PWM signals, and the rotation speed becomes a maximum at the 100% duty.

Switching elements such as power MOSFETs in the inverter circuit 17 permit an increased current to flow with an increase in the duty ratio of PWM signals and, therefore, generate heat in increased amounts. At 100% duty, however, the switching loss decreases and heat generates in decreased amounts. Unless the elements are capable of withstanding the heat generated at a maximum switching duty, the elements are likely to be destroyed. Therefore, elements or parts for radiating heat tend to become bulky and result in an increase in the cost.

To counter this problem, US 2007/52382A (JP 2006-25565A) and JP 2006-157987A proposes a method to decrease the switching loss by lowering the carrier frequency of PWM signals when the motor is rotating at high speeds (i.e., when the duty ratio is large) or when the detected temperature of the elements is high. However, the carrier frequency if lowered may become audible, and the user may perceive it as the occurrence of offensive noise.

As other method, although the motor 7 is rotated at its normal speed by setting an upper limit (e.g., 80%) which is smaller than 100% as the PWM duty, it is driven to rotate at the 100% duty to lower the generation of heat. Even with this method, however, the rotation speed of the motor is no longer linearly controlled or the rotation speed suddenly changes, when the duty is switched from the upper limit value to 100% producing a bursting sound or permitting an inrush current to flow.

SUMMARY OF THE INVENTION

The present invention therefore has its object to provide a motor drive apparatus and method, which continuously control a rotation speed of a motor while suppressing generation of heat of switching elements.

According to one aspect of a motor drive apparatus, if a PWM duty exceeds an upper limit value, a duty signal processing portion divides a switching current supply period of each of the phases into a first current supply period for setting the duty to be larger than the upper limit value and a second current supply period for setting the duty to 100%, and sets the length of the second current supply period depending upon the determined duty.

That is, if the PWM duty dependent upon a speed instruction exceeds the upper limit value, the motor is driven by varying a ratio of the first current supply period in which the duty assumes the upper limit value and the second current supply period in which the duty is 100%. Therefore, there is produced no PWM signal of a duty lying in a range of the upper limit value to 100%, suppressing a rise of temperature of the switching elements as compared to when the PWM duty is set in excess of the upper limit value as in the prior art.

BRIEF DESCRIPTION OF THE DRAWINGS

The above and other objects, features and advantages of the present invention will become more apparent from the following detailed description made with reference to the accompanying drawings. In the drawings.

DESCRIPTION OF THE PREFERRED EMBODIMENT

First Embodiment

Figure 1:
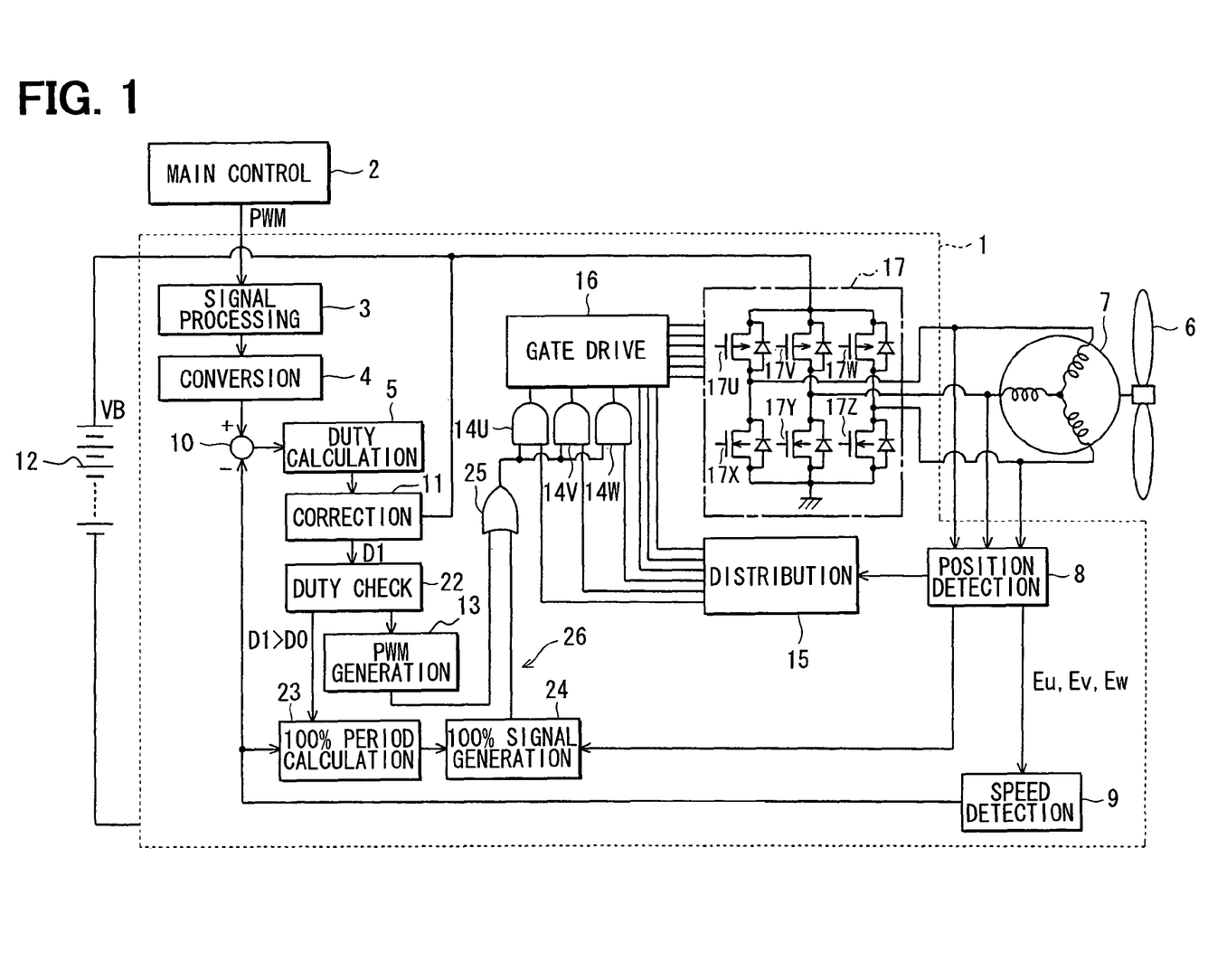
FIG. 1 is a circuit diagram illustrating a motor drive apparatus according to a first embodiment of the present invention.

Referring first to Referring FIG. 1, a first embodiment of a motor drive apparatus is illustrated as a motor drive apparatus 1 for a fan motor of multiple (three) phases arranged in the radiator portion of a vehicle. This embodiment is similar to the conventional apparatus shown in FIG. 12, different in that a duty check circuit 22, a 100% period calculation circuit 23, a 100% signal generation circuit 24 and an OR gate 25.

The duty check circuit 22 is provided between the voltage correction circuit 11 and the PWM signal generation circuit 13 to check whether a PWM signal duty D1 instruction output from the voltage correction circuit 11. The duty check circuit 22 sets an upper limit value D0 (e.g., 80%) for the PWM signal duty D1 instruction. The duty instruction D1 is output to the PWM signal generation circuit 13 at all times, but is output to the 100% period calculation circuit 23 only when the duty instruction D1 is in a range D0<D1≦100.

To provide a period for supplying a current by setting the duty of PWM signal to 100% within a current supply period of an electric angle of 60 degrees, the 100% period calculation circuit 23 calculates the current supply period $T_{FON}$ according to, for example, the following equation, $$T_{FON}=(D1-D0)/(100-D0) \times T_{60} \quad (1)$$

where $T_{60}$ is a period corresponding to a current supply period of an electric angle of 60 degrees, and is calculated based on rotational angle signals applied from the rotation speed detection circuit 9.

The 100% current supply period $T_{FON}$ that is calculated is output to the 100% signal generation circuit 24. The 100% signal generation circuit 24 produces a 100% current supply signal in synchronism with the timings of detecting the rising edge and falling edge of the position detection signals from the position detection circuit 8.

The 100% current supply signal and the PWM signal output from the PWM signal generation circuit 13 are input to the input terminals of the OR gate 25, and the output terminal of the OR gate 25 is connected in common to the input terminals on one side of the AND gates 14U, 14V and 14W. The PWM signal generation circuit 13, duty check circuit 22, 100% period calculation circuit 23, 100% signal generation circuit 24 and OR gate 25 form a duty signal processing circuit 26.

Figure 2:
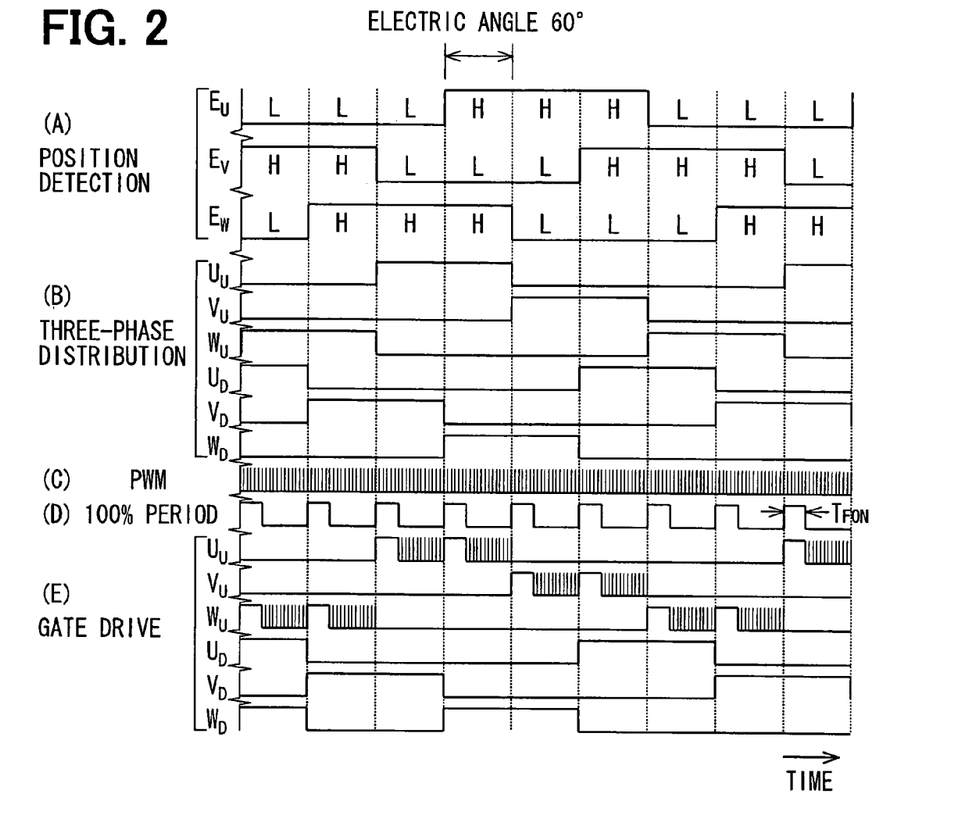
FIG. 2 is a timing chart illustrating waveforms developed in the first embodiment.

Next, the operation of this embodiment will be described with reference to FIGS. 2 to 4. As illustrated in FIG. 2, the three-phase current distribution circuit 15 logically synthesizes position detection signals Eu, Ev, Ew as indicated in (A), and distributes the current supply signals in a manner that the current supply period of each of the phases becomes an electric angle of 120 degrees as indicated in (B). In this embodiment, when the duty instruction D1 is D0<D1≦100 as described above, the 100% period calculation circuit 23 calculates the 100% current supply period $T_{FON}$ according to the equation (1).

The equation (1) is for calculating the current supply period $T_{FON}$ based on a difference between the original duty instruction D1 and the upper limit value D0. If, for example, the upper limit value D0 is 80% and the duty instruction D1 is 90%, then $$T_{FON}=(90-80)/(100-80) \times T_{60}=T_{60}/2$$

Referring to (D) in FIG. 2, the 100% current supply signal is produced twice at the beginning of a section (period) of an electric angle of 60 degrees in synchronism with any edge timing of the three-phase position detection signals, i.e., in the switching current supply period (electric angle of 120 degrees) of each of the phases. The PWM signal (C) and the 100% current supply signal (D) are applied to the OR operation through the OR gate 25.

As a result as indicated in (E), the gate drive signal includes a current supply period (second current supply period) of 100% duty at the head of the section of electric angle of 60 degrees in the switching current supply period and a subsequent current supply period (first current supply period) of duty D0. Here, it is presumed that the gate drive signals shown in (E) are all those that turn the FETs on when they are of a high level (turn on the P-channel FETs on the high side, too). The gate drive signals U$_D$, V$_D$ and W$_D$ are output to the low-side FETs 17X, 17Y and 17Z.

Figure 3:
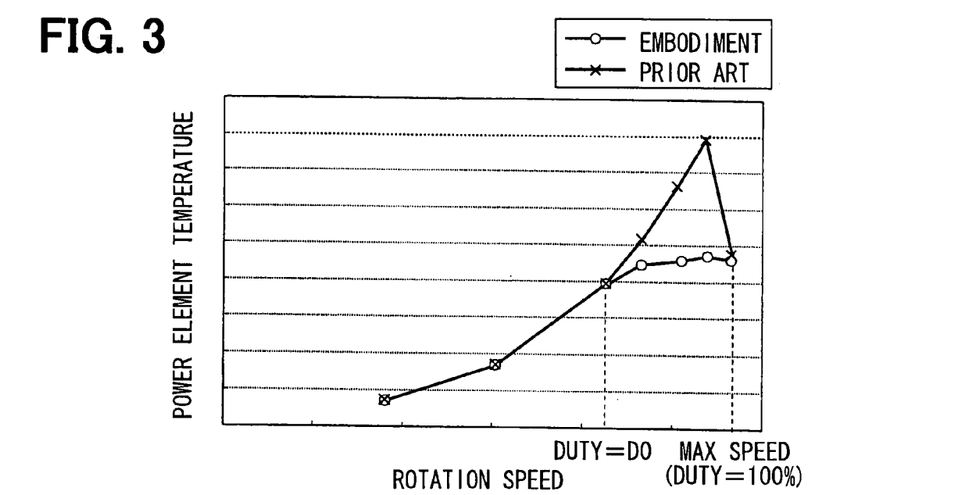
FIG. 3 is a graph illustrating temperatures of heat generated by FETs of an inverter circuit in the first embodiment in comparison to a prior art apparatus.

FIG. 3 illustrates temperatures of heat generated by FETs (power elements) constituting the inverter circuit 17 in comparison between the first embodiment and the prior art apparatus (FIG. 12). Here, the upper limit duty D0 is set to be 82.5%. In the motor drive apparatus 1 of the prior art, the temperature starts elevating remarkably from this point with an increase in the duty. With the motor drive apparatus 1 of this embodiment, on the other hand, the temperature rises very slightly and, therefore, nearly flat characteristics are exhibited up to the duty 100%, at which the motor 7 rotates at a maximum speed.

Figure 4A:
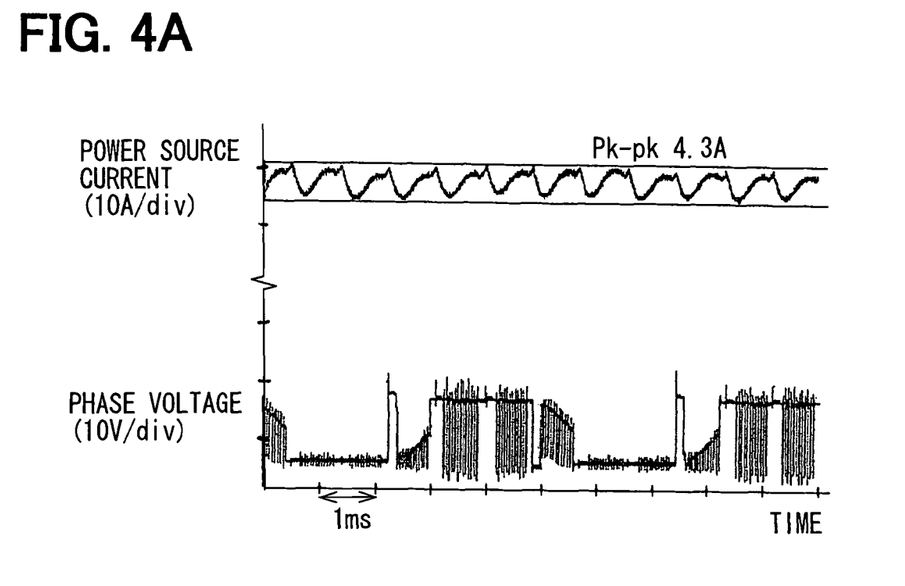
FIGS. 4A and 4B are timing charts illustrating waveforms of current ripples generated in the first embodiment and in the prior art apparatus, respectively.
Figure 4B:
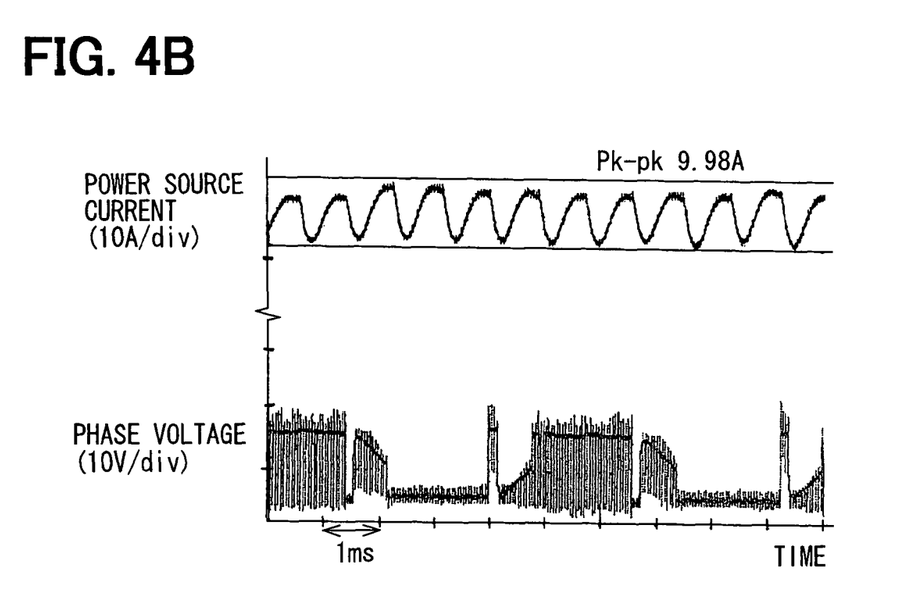

The observed waveforms of current ripples of a power source in the first embodiment and in the prior art apparatus are illustrated in FIG. 4A and FIG. 4B, respectively, while setting the rotation speed to be the same. In the prior art apparatus 1 (FIG. 4B), a peak-to-peak (Pk-pk) value of a ripple is 9.98 A. In the present embodiment (FIG. 4A), the above value is 4.3 A, indicating a decrease in the level of ripples down to not less than one-half.

According to the first embodiment, if the PWM duty D1 determined by the duty calculation circuit 5 exceeds the upper limit value D0, the duty signal processing circuit 26 in the motor drive apparatus 1 divides the switching current supply period of each of the phases into a first current supply period for setting the duty to the upper limit value D0 and a second current supply period for setting the duty to 100%, and sets the length of the second current supply period depending upon the duty D1. Therefore, the temperature of the FETs in the inverter circuit 17 is suppressed as compared to when the PWM duty is set in excess of the upper limit value D0. Besides, the rotation speed of the motor 7 can be continuously controlled.

Further, the 100% period calculation circuit 23 in the duty signal processing circuit 26 sets the length of the second current supply period depending upon a difference between the duty D1 and the upper limit value D0 or, specifically, depending upon the equation (1) making it possible to linearly control the rotation speed of the motor 7.

In the switching current supply period of each phase, further, the duty signal processing circuit 26 sets the second current supply period a plurality of times. Therefore, the period in which the current flows at 100% duty is more dispersed lowering the vibration at the time when the motor 7 is driven and making it possible to execute stable driving. Specifically, the second current supply period is set at the beginning of the section of an electric angle of 60 degrees in the switching current supply period of each of the phases. That is, in the 120-degree current supply system, the current supply pattern among the phases is changed over for every electric angle of 60 degrees. Besides, the above section of an electric angle of 60 degrees can be easily obtained relying upon the position detection signals of the rotor making it easy to set and control the second current supply period.

Second Embodiment

Figure 5:
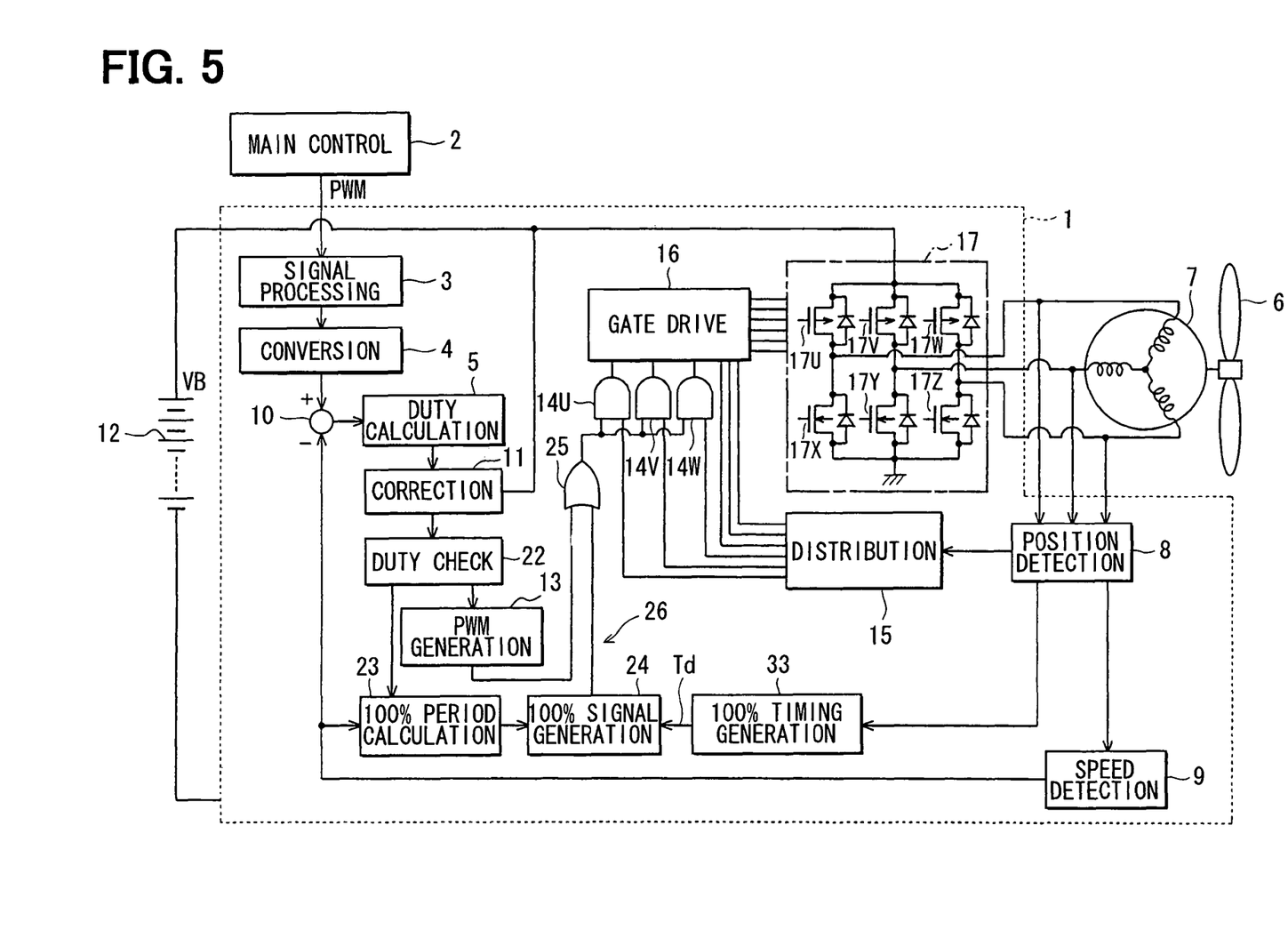
FIG. 5 is a circuit diagram illustrating a motor drive apparatus according to a second embodiment of the present invention.

According to a second embodiment, as illustrated in FIG. 5, the motor drive apparatus 1 has a 100% timing generation circuit 33, which is provided between the position detection circuit 8 and the 100% signal generation circuit 24.

The 100% timing generation circuit 33 generates a delay time Td by counting the time using an internal counter from the start of the section of an electric angle of 60 degrees, which is obtained based on position detection signals Eu, Ev and Ew from the position detection circuit 8, and outputs the delay time signal to the 100% signal generation circuit 24. After the passage of the delay time Td, the 100% signal generation circuit 24 produces a 100% current supply signal.

Figure 6:
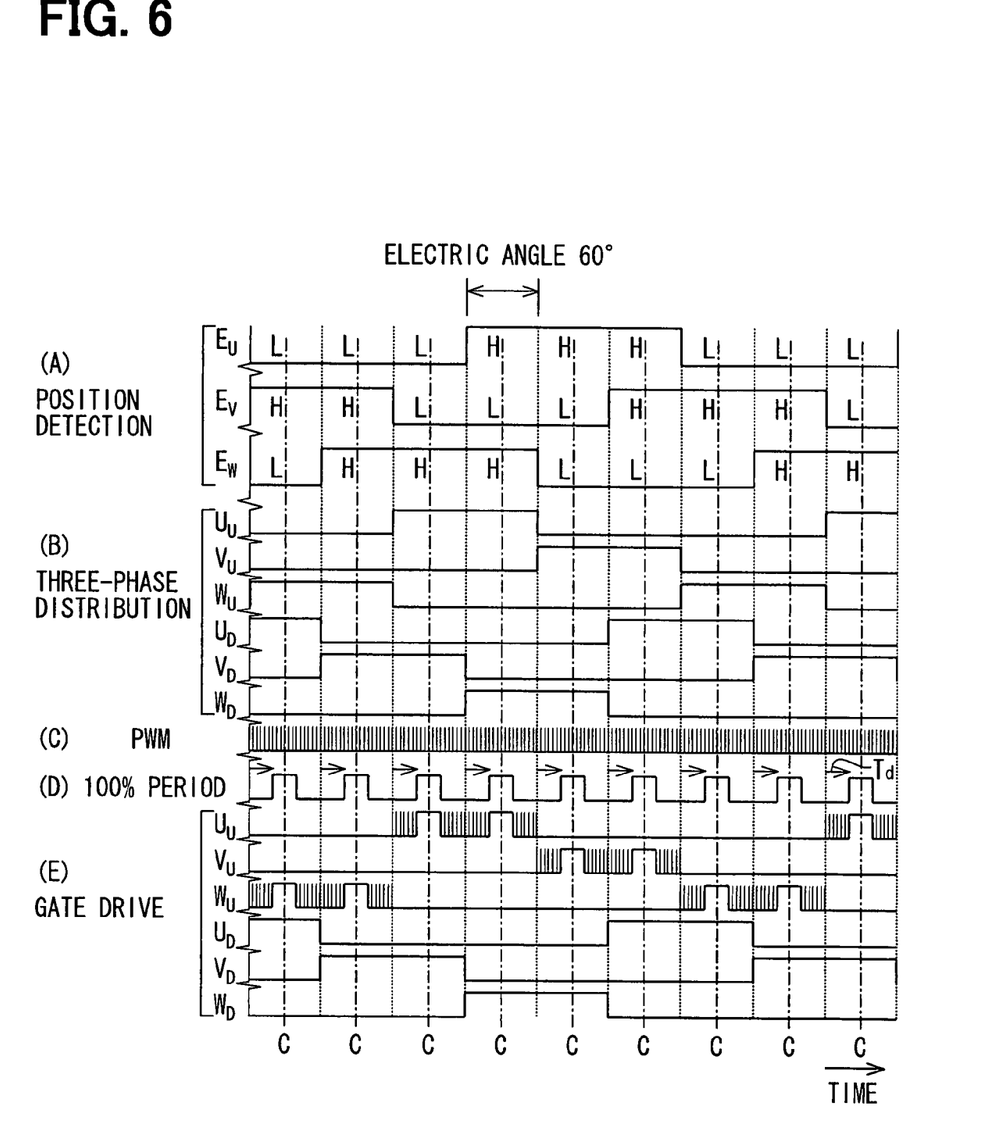
FIG. 6 is a timing chart illustrating waveforms developed in one case in the second embodiment.

Next, the operation of the second embodiment will be described with reference also to FIGS. 6 and 7. FIG. 6 illustrates a case of 100% current supply period, i.e., a case where the second current supply period is set at each center C or midpoint of the current supply section of an electric angle of 60 degrees. At this moment, the 100% timing generation circuit 33 calculates the delay time Td according to the following equation, $$Td = (T_{60} - T_{FON})/2 \quad (2)$$

Figure 7:
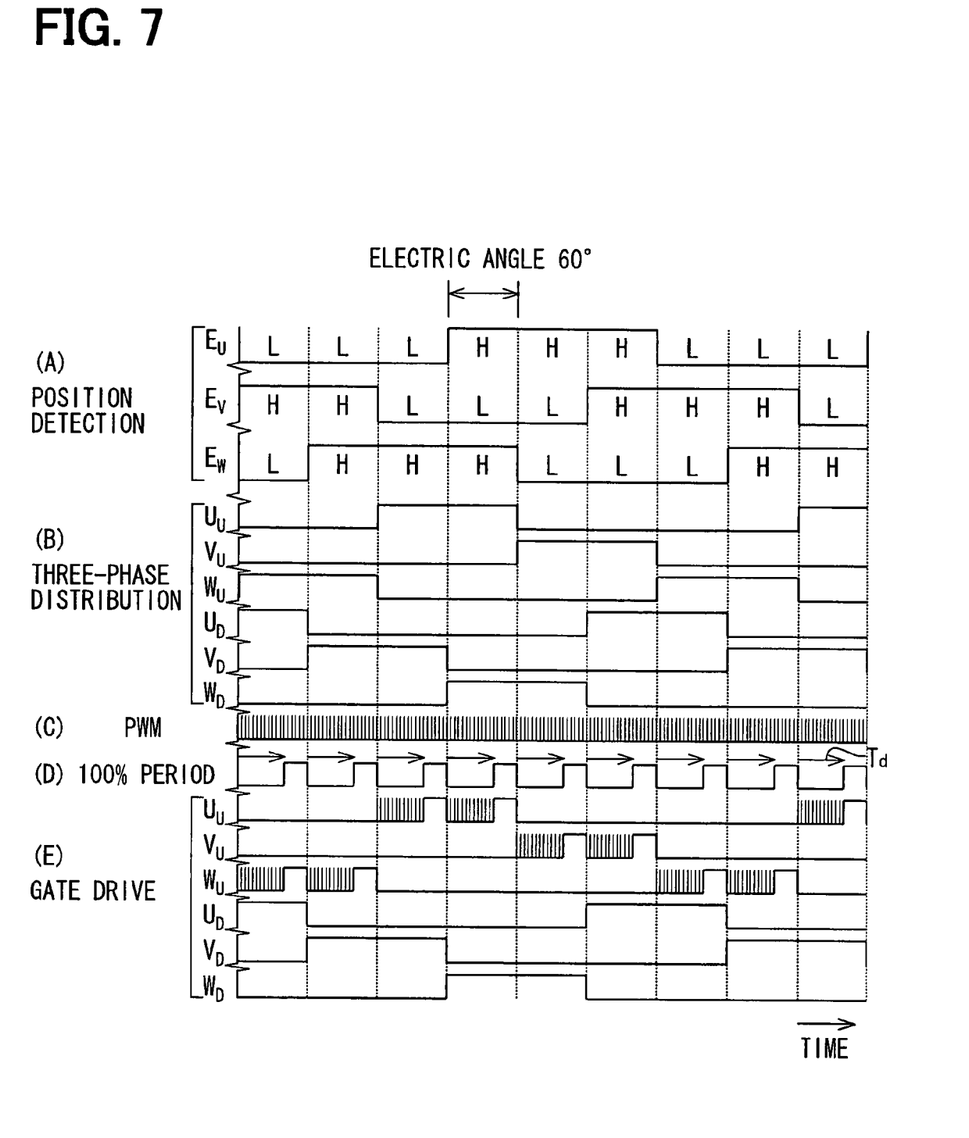
FIG. 7 is a timing chart illustrating waveforms developed in another case in the second embodiment.

FIG. 7 illustrates a case where the second current supply period is set at the end of the current supply section of an electric angle of 60 degrees. In this case, the 100% timing generation circuit 33 calculates the delay time Td according to the following equation, $$Td = T_{60} - T_{FON} \quad (3)$$

Like in the case of the first embodiment illustrated in FIG. 2, the motor drive apparatus 1 of the second embodiment, too, is capable of setting the second current supply period at the beginning of the current supply section of an electric angle of 60 degrees. In this case, Td should be set to be 0.

According to the second embodiment, the second current supply period is set at the intermediate portion or at the end of the section of the electric angle of 60 degrees in the switching current supply period of each of the phases, and therefore exhibits the same effect as that of the first embodiment.

Third Embodiment

Figure 8:
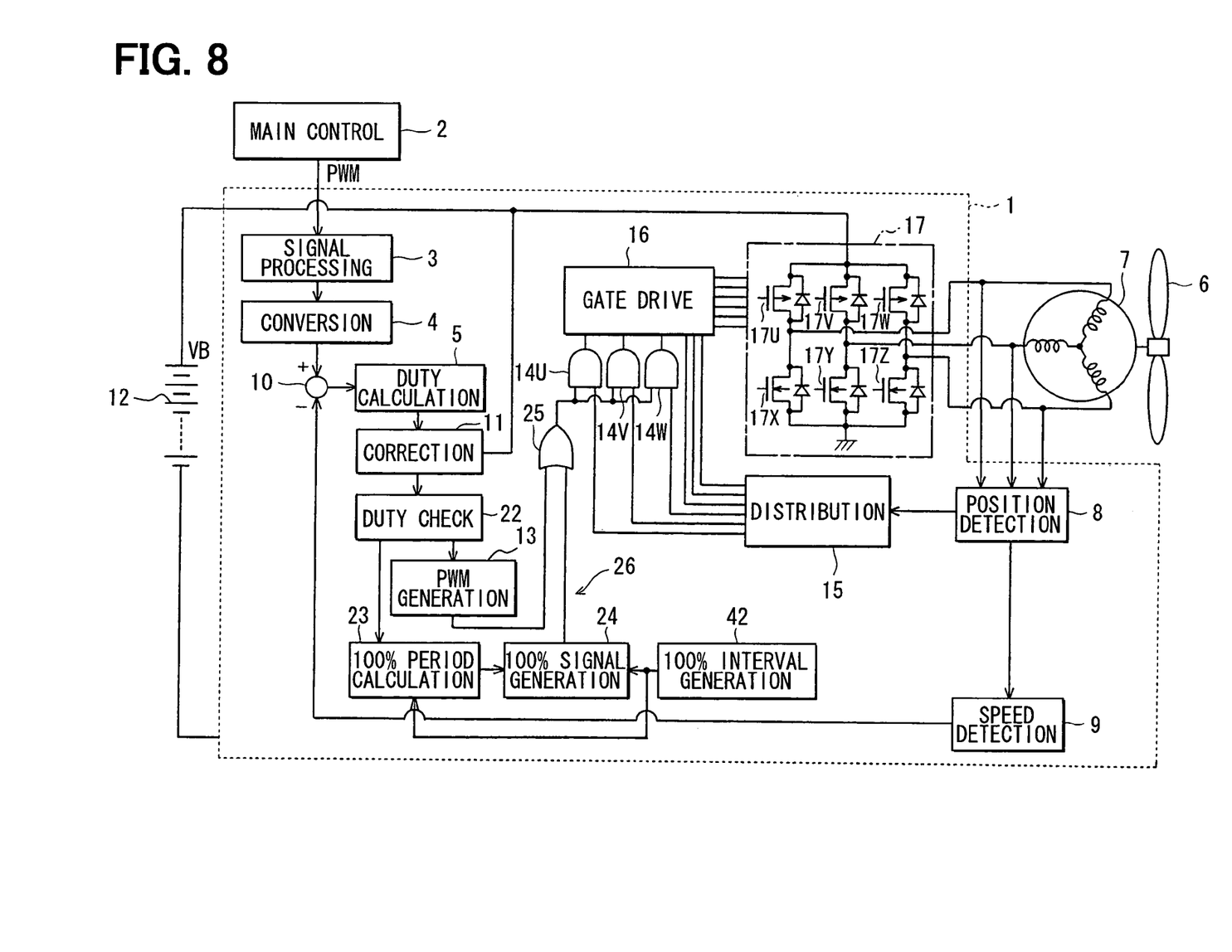
FIG. 8 is a circuit diagram illustrating a motor drive apparatus according to a third embodiment of the present invention.

According to a third embodiment, as illustrated in FIG. 8, the motor drive apparatus 1 has a 100% interval generation circuit 42 provided in place of the 100% timing generation circuit 33 of the second embodiment. The 100% interval generation circuit 42 generates, through an internal clock or a counter thereof, an interval for setting the second current supply period in the switching current supply period of each of the phases, and outputs an interval signal to the 100% signal generation circuit 24.

The 100% period calculation circuit 23 receives this interval signal from the 100% interval generation circuit 42 instead of receiving the rotation speed signal from the rotation speed detection circuit 9, and determines the current supply period T$_{FON}$ by using the interval signal instead of using T$_{60}$ of the equation (1).

Next, the operation of the third embodiment will be described with reference also to FIG. 9. The 100% interval generation circuit 42 generates the 100% current supply interval signal as indicated in (F). The 100% signal generation circuit 24 generates the 100% current supply signal depending upon the current supply period T$_{FON}$ determined by the 100% period calculation circuit 23 in synchronism with the output timing (rise timing) of the interval signal. As a result, in the switching current supply period of each of the phases, the second current supply period is set only one time on the way thereof (E). The 100% current supply interval signals output by the 100% interval generation circuit 42 are indicated in a manner of in synchronism with the rotation speed of the motor 7, which, however, may be out of synchronism, as a matter of course.

According to the third embodiment, the second current supply period is set based on the interval signal generated by the 100% interval generation circuit 42, and exhibits the effect similar to the same as those of the first and second embodiments.

Fourth Embodiment

Figure 10:
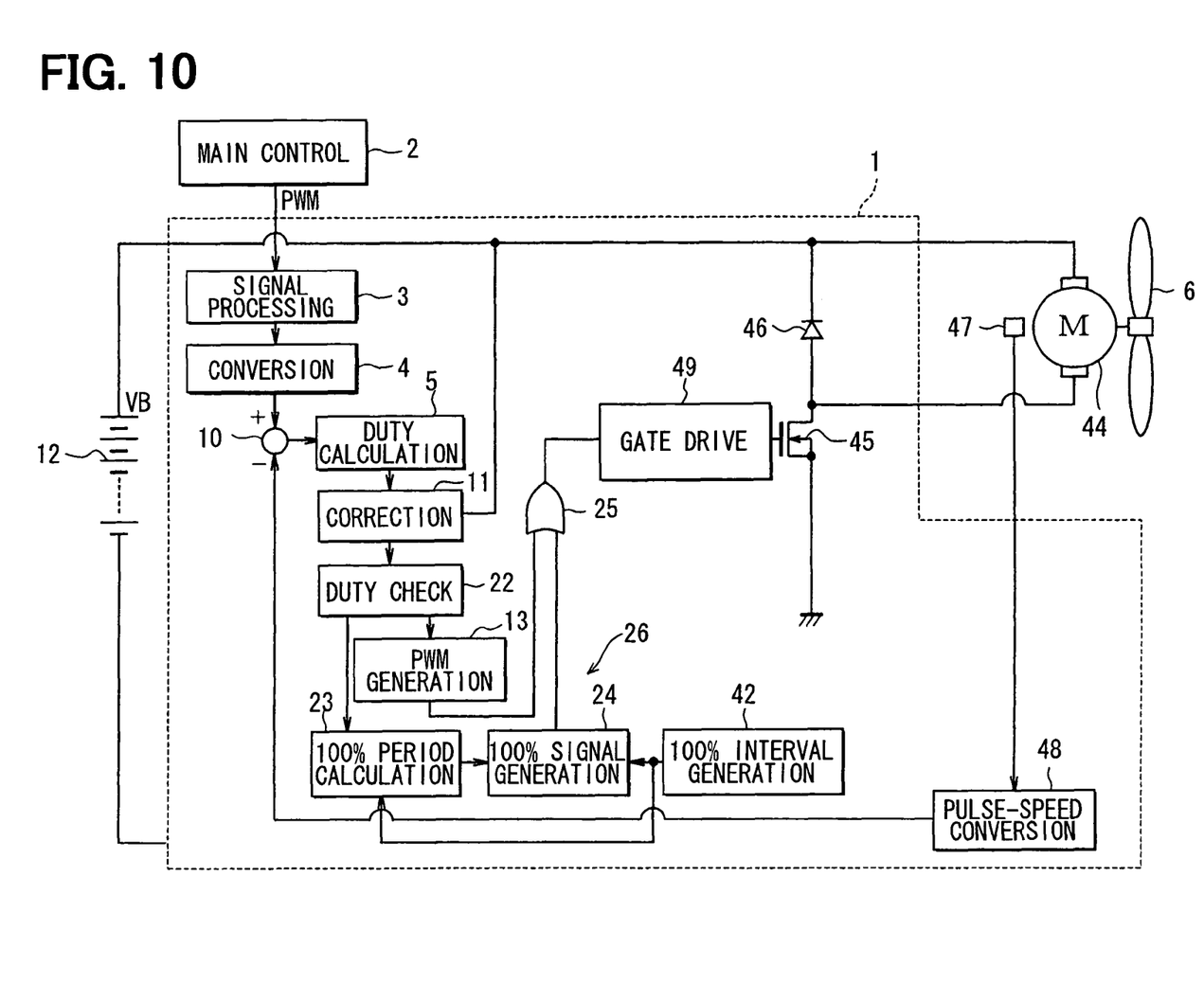
FIG. 10 is a circuit diagram illustrating a motor drive apparatus according to a fourth embodiment of the present invention.

According to a fourth embodiment, as illustrated in FIG. 10, a DC motor (motor with brush) 44 is used to drive the fan 6 and hence no inverter circuit 17 is provided as opposed to the foregoing embodiments. A series circuit of the motor 44 and an N-channel MOSFET 45 is connected between the positive terminal of the battery 12 and ground as a low-side drive system). A flywheel diode 46 is connected across both terminals of the motor 44.

Further, the position detection circuit 8, rotation speed detection circuit 9, AND gate 14, three-phase current distribution circuit 15 and gate drive circuit 16 in the foregoing embodiments are not provided. Instead, there are arranged an encoder 47 which outputs pulse signals accompanying the rotation of the motor 44 and a pulse-speed conversion circuit 48 for converting the interval among the pulse signals output from the encoder 47 into the rotation speed. The output signals of the conversion circuit 48 are input to the subtractor 10. The output signals from the OR gate 25 are output to the gate of FET 45 through a gate drive circuit 49.

Next, the operation of the fourth embodiment will be described. The operation of the 100% signal generation circuit 24 is basically the same as that of the third embodiment, and the 100% current supply signal is output in synchronism with the timing of the 100% interval signal $T_{100}$ output from the 100% interval generation circuit 42. In this case, the 100% period calculation unit 23 calculates the current supply period $T_{FON}$ according to, for example, the following equation, $$F_{FON}=(D1-D0)/(100-D0) \times T_{100} \quad (4)$$

Therefore, the 100% signal generation circuit 24 outputs the 100% current supply signal in the same manner as in the third embodiment.

Figure 9:
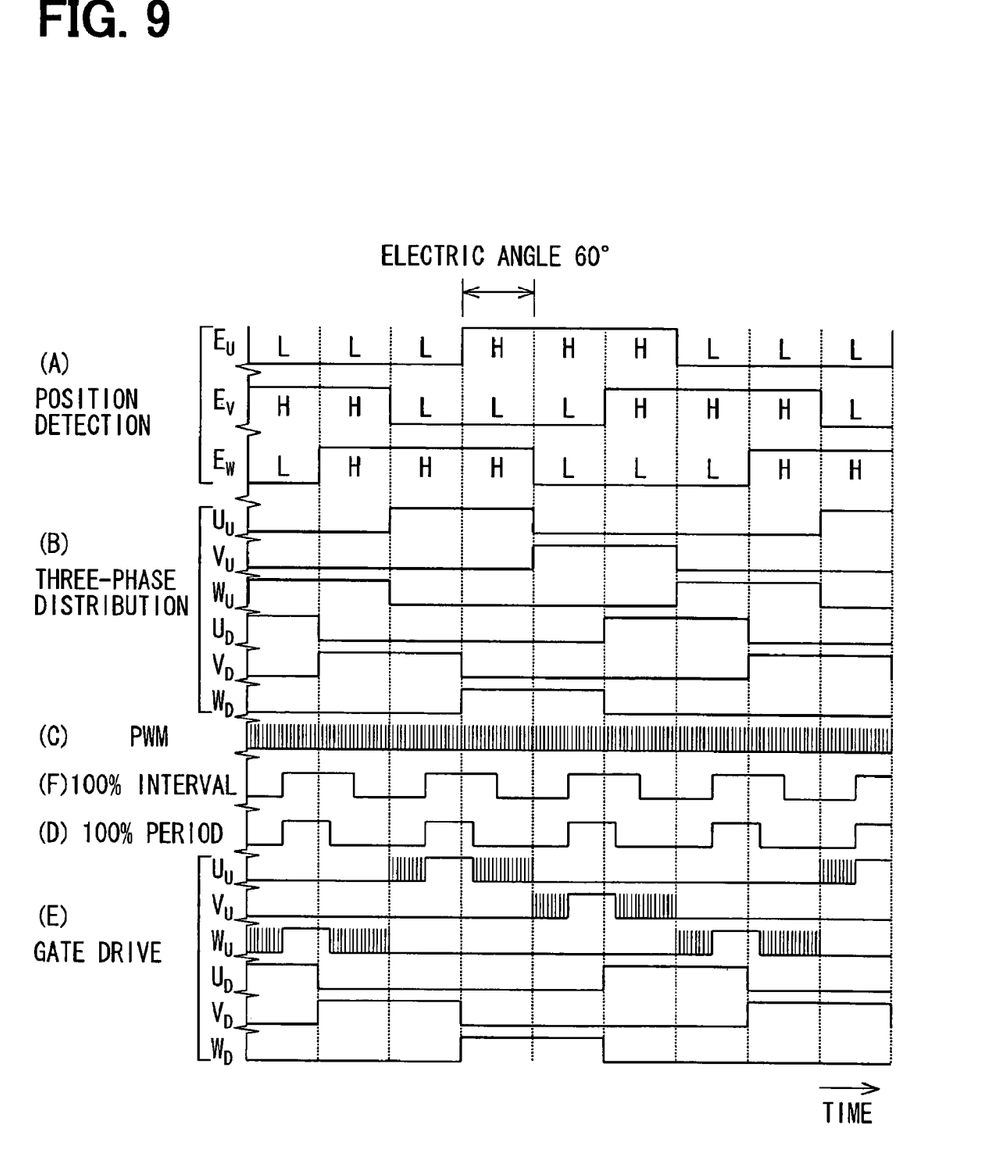
FIG. 9 is a timing chart illustrating waveforms developed in the third embodiment.

Then, through the OR gate 25 and the gate drive circuit 49, a PWM signal synthesized in the same manner as indicated in (E) of FIG. 9 is output in a single phase to the gate of the FET 45, and the DC motor 44 is duty-controlled. When the load to the motor 44 is a load having a large moment of inertia like the fan 6, the interval for producing the 100% current supply interval signals $T_{100}$ may be set to be relatively long yet to control the motor without permitting the rotation speed to fluctuate.

According to the fourth embodiment, generation of heat due to the switching loss of FET 45 is suppressed even when the DC motor 44 is driven on the low potential side by the FET 45.

Fifth Embodiment

Figure 11:
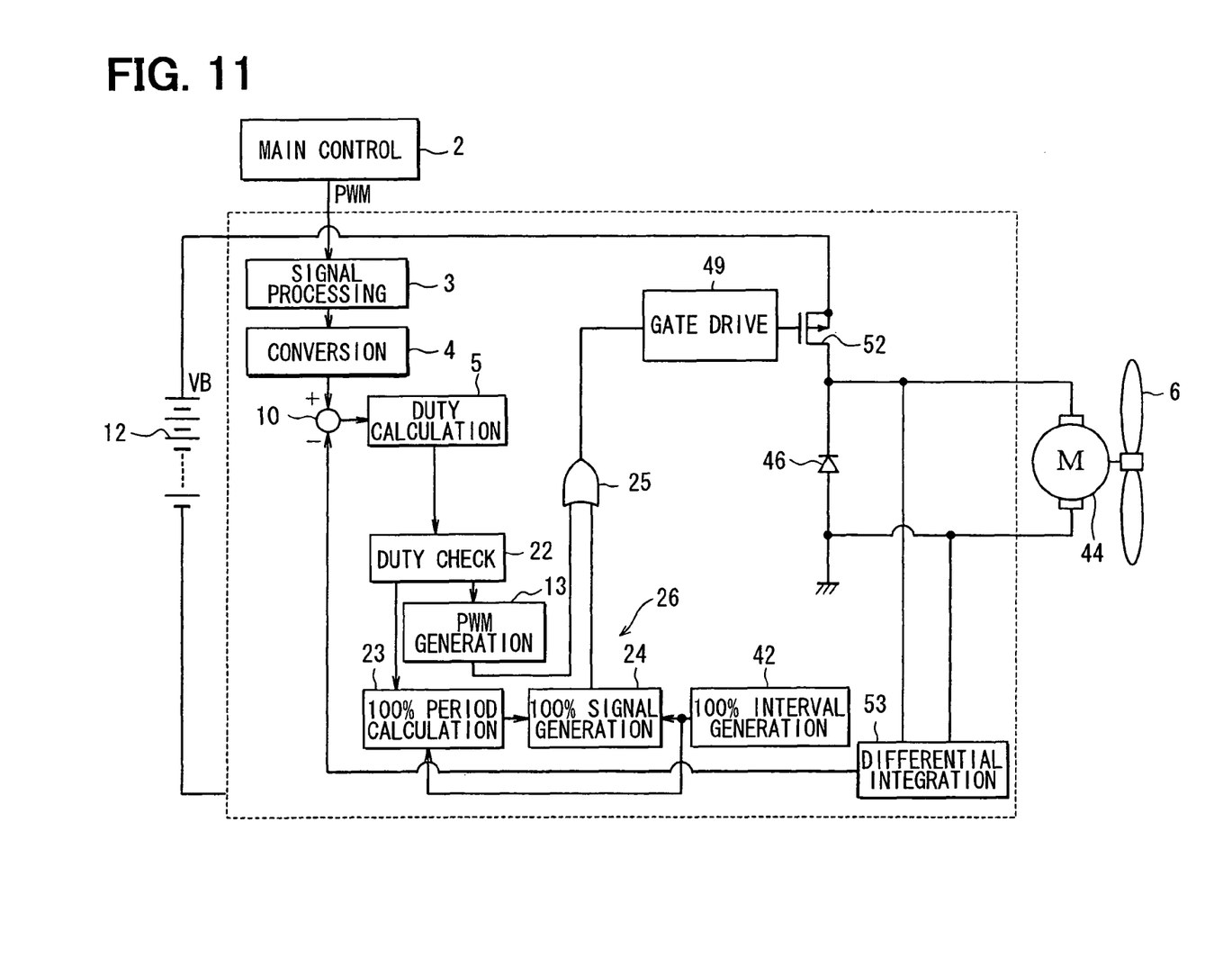
FIG. 11 is a circuit diagram illustrating a motor drive apparatus according to a fifth embodiment of the present invention.

According to a fifth embodiment, as illustrated in FIG. 11, the DC motor 44 is provided to be driven in a high side drive system. That is, a series circuit of a P-channel MOSFET 52 and the motor 44 is connected between the positive terminal of the battery 12 and ground. The encoder 47 and the conversion circuit 48 of the fourth embodiment are not provided. Instead, a differential integration circuit 53 is arranged to differentially integrate the voltage across both terminals of the motor 44. The output signal of the differential integration circuit 53 is applied to the subtractor 10.

The output signal of the differential integration circuit 53 reflects the voltage applied to the motor 44 and, therefore, the voltage correction circuit 11 in the foregoing embodiments is not provided.

Next, the operation of the fifth embodiment will be described. In the fifth embodiment, the motor 44 is duty-controlled by the FET 52 whereby the voltage applied across the terminals of the motor 44 is detected by the differential integration circuit 53, and the detected output is reflected on the operation of the duty ratio in the duty calculation circuit 5. Therefore, the motor 44 can be controlled by feedback without using the encoder 47.

According to the fifth embodiment, generation of heat by the FET 52 can be suppressed even in a case that the motor 44 is controlled at the high potential side.

The above embodiments may be modified in many ways.

For instance, the length $T_{FON}$ of the second current supply period is not limited to the one that is set based on the equation (1). The voltage correction circuit 11 may be provided only when required.

In the first and second embodiments, the second current supply period may be set to be any one of at the "beginning", at the "intermediate portion" or at the "end" of the switching current supply period of an electric angle of 120 degrees, or may be set to be at the three or more places therein.

In the third embodiment, too, the 100% current supply interval signal may be so output that the second current supply period is set two or more times in one switching current supply period.

In the fourth or fifth embodiment, the 100% current supply interval signal may be a rotational period of the DC motor 44. In this case, a signal for maintaining synchronism with the rotational period may be input to the 100% interval generation circuit 42. This is also possible in the case of the third embodiment. With this arrangement, the second current supply period is surely provided in one rotation of the motor 44, and the motor 44 can be driven stably.

The motor 7, 44 is not limited to driving the fan motor mounted on the vehicle.

What is claimed is:

1. A motor drive apparatus for driving a motor based on PWM control, comprising:
    a duty calculation means for calculating a duty of PWM signals depending upon a speed instruction; and
    a duty signal processing means which, when a calculated duty of the duty calculation means exceeds an upper limit value, divides a switching current supply period in each phase into a first current supply period in which the duty is set to the upper limit value and a second current supply period in which the duty is set to 100%, and sets a length of the second current supply period depending upon the calculated duty,
    wherein the motor is a brushless DC motor,
    wherein the duty signal processing means sets the second current supply period a plurality of times in the switching current supply period in each phase, and
    wherein the plurality of times are dispersed across the switching current supply period.

2. The motor drive apparatus according to claim 1, wherein:
    the duty signal processing means sets the length of the second current supply period depending upon a difference between the calculated duty and the upper limit value.

3. The motor drive apparatus according to claim 1, wherein:

the motor is a three-phase motor in which the switching current supply period is switched over at every electric angle of 120 degrees; and the duty signal processing means sets the second current supply period at a beginning of a section of an electric angle of 60 degrees in each switching current supply period of electric angle of 120 degrees.

4. The motor drive apparatus according to claim 1, wherein:

the motor is a three-phase motor in which the switching current supply period is switched over at every electric angle of 120 degrees; and the duty signal processing means sets the second current supply period at an intermediate portion of a section of an electric angle of 60 degrees in each switching current supply period of electric angle of 120 degrees.

5. The motor drive apparatus according to claim 1, wherein:

the motor is a three-phase motor in which the switching current supply period is switched over at every electric angle of 120 degrees; and the duty signal processing means sets the second current supply period at an end of a section of an electric angle of 60 degrees in each switching current supply period of electric angle of 120 degrees.

6. The motor drive apparatus according to claim 1, wherein:

the duty signal processing means sets the second current supply period at every predetermined interval.

7. The motor drive apparatus according to claim 6, wherein:

the duty signal processing means sets the second current supply period for every rotation period of the motor.

8. The motor drive apparatus according to claim 1, wherein:

at least two switching current supply periods are formed in 360 electrical degrees of operation.

9. The motor drive apparatus according to claim 1, wherein:

the plurality of times are dispersed evenly over the switching current supply period.

10. The motor drive apparatus according to claim 1, wherein:

the plurality of times are dispersed every 60 degrees throughout the switching current supply period.

11. A motor drive method for driving a motor based on PWM control, comprising:

calculating a duty of PWM signals depending upon a speed instruction; and dividing, when a calculated duty of the duty calculation means exceeds an upper limit value, a switching current supply period in each phase into a first current supply period in which the duty is set to the upper limit value and a second current supply period in which the duty is set to 100%, and sets a length of the second current supply period depending upon the calculated duty, wherein the motor is a brushless DC motor, wherein the second current supply period is set a plurality of times in the switching current supply period in each phase, and wherein the plurality of times are dispersed across the switching current supply period.

12. The motor drive method according to claim 11, wherein:

the length of the second current supply period is set depending upon a difference between the calculated duty and the upper limit value.

13. The motor drive method according to claim 11, wherein:

the motor is a three-phase motor in which the switching current supply period is switched over at every electric angle of 120 degrees; and the second current supply period is set at a beginning of a section of an electric angle of 60 degrees in each switching current supply period of electric angle of 120 degrees.

14. The motor drive method according to claim 11, wherein:

the motor is a three-phase motor in which the switching current supply period is switched over at every electric angle of 120 degrees; and the second current supply period is set at an intermediate portion of a section of an electric angle of 60 degrees in each switching current supply period of electric angle of 120 degrees.

15. The motor drive method according to claim 11, wherein:

the motor is a three-phase motor in which the switching current supply period is switched over at every electric angle of 120 degrees; and the second current supply period is set at an end of a section of an electric angle of 60 degrees in each switching current supply period of electric angle of 120 degrees.

16. The motor drive method according to claim 11, wherein:

the second current supply period is set at every predetermined interval.

17. The motor drive method according to claim 16, wherein:

the second current supply period is set for every rotation period of the motor.

18. The motor drive method according to claim 11, wherein:

at least two switching current supply periods are formed in 360 electrical degrees of operation.

19. The motor drive method according to claim 11, wherein:

the plurality of times are dispersed evenly over the switching current supply period.

20. The motor drive method according to claim 11, wherein:

the plurality of times are dispersed every 60 degrees throughout the switching current supply period.

* * * * *